US006816962B2

(12) United States Patent
Augsburg et al.

(10) Patent No.: US 6,816,962 B2
(45) Date of Patent: Nov. 9, 2004

(54) RE-ENCODING ILLEGAL OP CODES INTO A SINGLE ILLEGAL OP CODE TO ACCOMMODATE THE EXTRA BITS ASSOCIATED WITH PRE-DECODED INSTRUCTIONS

(75) Inventors: Victor Roberts Augsburg, Cary, NC (US); Jeffrey Todd Bridges, Raleigh, NC (US); Thomas Andrew Sartorius, Raleigh, NC (US); Rodney Wayne Smith, Raleigh, NC (US); Thomas Philip Speier, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 10/082,085

(22) Filed: Feb. 25, 2002

(65) Prior Publication Data

US 2003/0163670 A1 Aug. 28, 2003

(51) Int. Cl.[7] .................................................. G06F 9/30
(52) U.S. Cl. ........................................ 712/226; 712/213
(58) Field of Search ................................ 712/209, 226, 712/213, 216

(56) References Cited

U.S. PATENT DOCUMENTS

| 4,649,478 A | 3/1987 | Worley, Jr. ................... 364/200 |
| 5,233,696 A | 8/1993 | Suzuki ......................... 395/375 |
| 5,337,415 A | 8/1994 | DeLano et al. ............... 395/375 |
| 5,619,408 A | 4/1997 | Black et al. .................. 395/567 |
| 5,651,122 A | 7/1997 | Hartung et al. .............. 395/384 |
| 5,717,587 A | 2/1998 | Black et al. .................. 364/131 |
| 5,819,059 A | 10/1998 | Tran ............................ 395/389 |
| 5,852,741 A | 12/1998 | Jacobs et al. ............. 395/800.24 |
| 5,881,279 A | * 3/1999 | Lin et al. ..................... 712/244 |
| 5,940,602 A | 8/1999 | Narayan et al. ............. 395/389 |
| 5,951,671 A | * 9/1999 | Green .......................... 712/23 |
| 5,970,235 A | 10/1999 | Witt et al. ................... 395/389 |
| 6,122,729 A | * 9/2000 | Tran ............................ 712/244 |
| 6,263,429 B1 | 7/2001 | Siska .......................... 712/245 |
| 6,457,117 B1 | * 9/2002 | Witt ............................ 712/213 |

OTHER PUBLICATIONS

J. A. Kahle, "Opcode Remap and Compression in Hard–Wired RISC Microprocessor," *IBM Technical Disclosure Bulletin*, vol. 32, No. 10A, Mar. 1990, p. 349.

V. R. Augsburg et al., Pending patent application Ser. No. 10/082,144 filed on Feb. 25, 2002 entitled "Efficiently Calculating a Branch Target Address".

* cited by examiner

*Primary Examiner*—Richard L. Ellis
*Assistant Examiner*—Barry O'Brien
(74) *Attorney, Agent, or Firm*—Winstead, Sechrest & Minick, P.C.; Scott W. Reid

(57) ABSTRACT

A method and system for utilizing bits in a collection of illegal op codes in order to enable pre-decoded instructions to be stored in an instruction cache without increasing the number of bits required to represent the pre-decoded instructions. Upon fetching an instruction from memory, the op code is examined for membership in a collection of illegal op codes. If the instruction op code is a member of this collection, the instruction may be re-encoded to use a different, common illegal op code. If the instruction op code is not a member of the collection of illegal op codes, but is instead an instruction to be stored in the instruction cache in a pre-decoded format, the additional pre-decoded information may be stored in the instruction encoding by utilizing the portion of the op code space which has been vacated by the re-encoding of the illegal op codes.

16 Claims, 3 Drawing Sheets

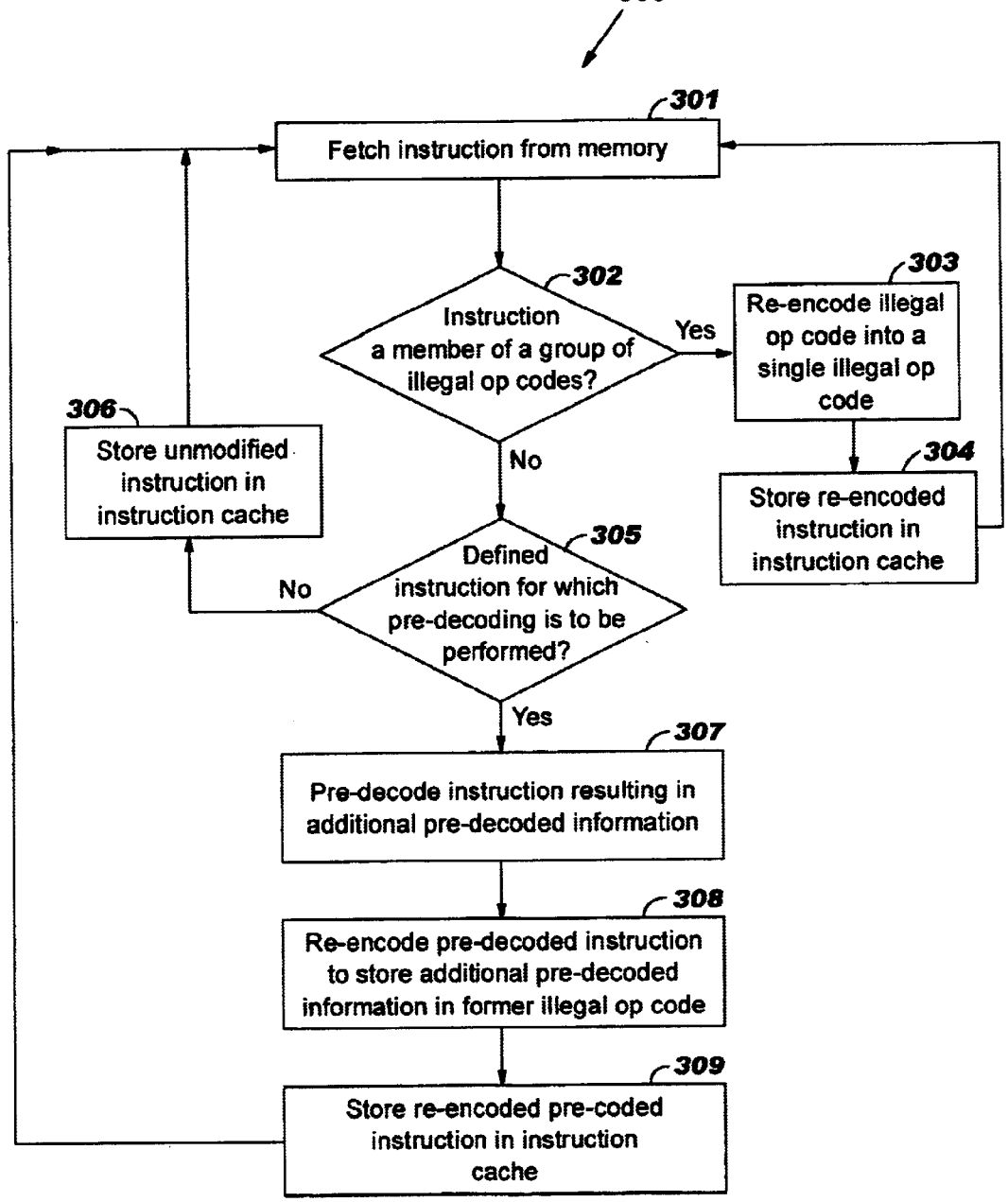

RE-ENCODING ILLEGAL OP CODES INTO A SINGLE ILLEGAL OP CODE TO ACCOMMODATE THE EXTRA BITS ASSOCIATED WITH PRE-DECODED INSTRUCTIONS

CROSS REFERENCE TO RELATED APPLICATION

The present invention is related to the following U.S. patent application which is incorporated herein by reference:

Ser. No. 10/082,144 entitled "Efficiently Calculating a Branch Target Address" filed Feb. 25, 2002.

TECHNICAL FIELD

The present invention relates to the field of instruction execution in computers, and more particularly to re-encoding illegal op codes into a single illegal op code thereby freeing up the vacated illegal op codes to be used to accommodate the extra bits associated with other pre-decoded defined instructions.

BACKGROUND INFORMATION

Typically, instructions within an instruction set of a microprocessor may be encoded into specific, unique combinations of bits. These encoded instructions may be stored in memory and fetched into an instruction cache when needed by the executing program. As these instructions are read out of the instruction cache, the encoded bits are decoded into a larger number of bits ("control fields"), which may then be used to control the precise operation of the given instruction as it travels down the execution pipeline of the processor.

For example, the PowerPC™ processor architecture may encode all instructions into unique 32-bit values. Of these 32 bits, the first six-bits may be considered to be the "primary op code" field. Certain instruction encodings may be expanded into various "secondary op code" encodings, which utilize other bits of the 32-bit instruction encoding. In the PowerPC™ processor architecture, there may be over 200 instruction encodings where these may be encoded into various combinations of the 64 possible primary op codes. Some of the instruction encodings encoded into the various combinations of the 64 possible primary op codes may be expanded into many more secondary op codes.

When designing high frequency microprocessors, one of the difficult logic paths may be the logic path from the instruction cache to the execution pipeline. This logic path may involve the decoding of the instruction op code from the instruction cache. In order to alleviate the timing problems associated with this difficult logic path, one technique that has been used may commonly be referred to as "instruction pre-decode." With this technique, the instruction op codes may be typically decoded (or partially decoded) as they are fetched from memory. The instructions may then be stored in the instruction cache with the op codes being decoded or partially decoded. This may be beneficial because there may be less function involved in the logic paths between the memory and the instruction cache than there is between the instruction cache and the execution pipeline. For example, the logic path between memory and the instruction cache may simply involve steering the encoded instruction to the instruction cache input buffer, whereas the logic path between the instruction cache and the execution pipeline may involve decoding the instruction, determining that an instruction is a branch instruction, calculating the target address of the branch instruction, and re-directing the instruction fetching mechanism to a different instruction address. Thus, there may be more cycle time available for the decoding function to be performed in the former path as opposed to the latter. Consequently, when the pre-decoded instructions are later read out of the instruction cache, they may be passed to the subsequent pipeline stages without having to first perform the decoding function.

Oftentimes, certain instruction types may have a severe timing constraint on the instruction decode. For example, recognition and decode of a branch instruction may be particularly important since a branch instruction may redirect the instruction execution from one address to another. By recognizing and pre-decoding branch instructions, and storing this pre-decode information in the instruction cache, the latency associated with the subsequent fetch and execution of such branches may be minimized. Accordingly, a pre-decoding mechanism may for example create an explicit bit in the decoded version of the instruction to directly indicate the predicted direction of the branch, i.e., whether the branch is predicted to be taken or not.

The problem with this technique of instruction pre-decode is that it may increase the number of bits required to represent each instruction in the instruction cache and thus increase the physical size of the cache required to hold any given number of instructions. This increased size may also lead to an increase in the power consumed by the instruction cache, as well as an increase in the latency associated with accessing the cache.

It would therefore be desirable to develop a technique of utilizing bits in an illegal op code in order to not increase the number of bits required to represent each instruction in the instruction cache and thus prevent the increase in the physical size of the cache required to hold any given number of instructions.

SUMMARY

The problems outlined above may at least in part be solved in some embodiments by encoding illegal op codes in instructions into a single illegal op code. Extra bits associated with pre-decoded defined instructions may then be stored in the vacated illegal op codes. For example, as described in U.S. application Ser. No. 10/082,144 filed on Feb. 25, 2002, entitled "Efficiently Calculating a Branch Target Address," Attorney Docket No. RPS920010176US1, branch instructions may be pre-decoded to convert an n-bit "displacement" field into a combination of an n-bit "target" field and a "carry-out" field, requiring one extra bit in the instruction re-encoding. This extra bit of information may be encoded into the vacated op code space associated with the illegal instructions which have been re-encoded to use a single, different illegal op code, without requiring that the instruction cache contains an additional storage bit for the pre-decoded instruction.

In one embodiment of the present invention, a method for utilizing bits in an illegal op code in order to not increase the number of bits required to represent each pre-decoded instruction may comprise the step of re-encoding by a re-encoding logic unit a plurality of illegal op codes to use a single illegal op code, as described in greater detail below. An instruction may be fetched from a memory by an instruction cache coupled to the memory. Extra bits associated with pre-decoded defined instructions may then be encoded into the vacated illegal op codes as illustrated below.

A fetch unit coupled to the instruction cache may search for a copy of the address of the next instruction to be executed in the instruction cache. In the case of a cache miss, the instruction may be fetched from memory by the fetch unit.

A determination may then be made by the re-encoding logic unit coupled to the instruction cache as to whether or not the fetched instruction has an op code which is a member of a collection of illegal op codes. If the instruction op code is a member of this collection, the instruction may then be re-encoded to use a different, common illegal op code that is not a member of the collection. In one embodiment, there may be a collection of two illegal op codes which occupy the instruction encodings, e.g., binary values of 111000 and 111100. The re-encoding logic unit of such an embodiment may then re-encode all instances of these two instruction op codes into a different common illegal op code, e.g., binary value of 000001. Consequently, the two formerly illegal op codes become available for re-use by a pre-decoding logic unit in order to encode additional information associated with a pre-decoded instruction.

Accordingly, a determination may also be made by the pre-decoding logic unit as to whether or not the fetched instruction has an op code which is to be pre-decoded and stored in the instruction cache in its pre-decoded form. The op code may be pre-decoded and stored in the instruction cache in its pre-decoded form in order to provide additional information to a decode/selecting logic unit coupled to the instruction cache. In one embodiment, the pre-decoding logic unit may detect a relative branch instruction, which comprises an op code, e.g., binary value of 100000, a sign-bit, and a 25-bit displacement field. The pre-decoding logic unit may pre-decode this relative branch instruction by replacing the 25-bit displacement field with a 25-bit partial sum field and a 1-bit carry-out field. The 25-bit partial sum field may be formed by adding the 25-bit displacement field to the low-order 25 bits of the address of the branch instruction itself. The 1-bit carry-out field may be the carry-out of this 25-bit addition. In order to avoid the need for an extra storage bit in the instruction cache for this pre-decoded carry-out field, the pre-decoding logic unit may convert the op code field for the relative branch instruction, e.g., convert the op code field from binary value of 100000 to binary value of 111C00, where "C" is the carry-out field, thereby effectively utilizing the vacated op code space of the two re-encoded illegal op codes in order to encode the additional pre-decoded instruction information.

In this fashion, the combination of re-encoding a collection of illegal op codes into a single, common illegal op code, together with the use of this vacated op code space to contain additional information associated with pre-decoded instructions, provides the benefits of instruction pre-decoding outlined in U.S. application Ser. No. 10/082,144 filed on Feb. 25, 2002, entitled "Efficiently Calculating a Branch Target Address," without the costs associated with additional storage bits in the instruction cache to contain this additional pre-decoded information.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 3 is a flowchart of a method for utilizing bits in an illegal op code in order to not increase the number of bits required to represent each instruction in accordance with the present invention.

DETAILED DESCRIPTION

FIG. 1—System

Figure 1:
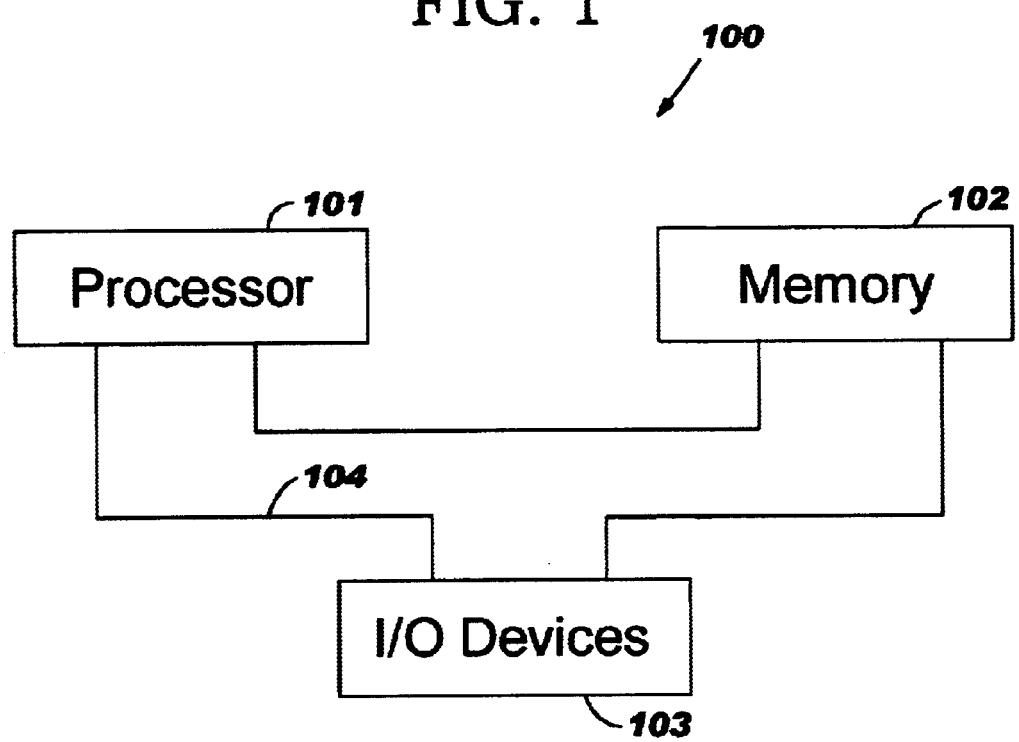
FIG. 1 illustrates a system configured in accordance with the present invention.

FIG. 1 illustrates an embodiment of a system 100 in accordance with the present invention. System 100 may comprise a processor 101 coupled to a main memory 102 configured to store instructions, e.g., branch instructions, via a bus 104. A more detailed description of processor 101 is described further below in connection with FIG. 2. Additional components coupled to bus 104 may include Input/Output (I/O) devices 103, e.g., disk drive controller. It is noted that those of ordinary skill in the art will appreciate that the hardware in FIG. 1 may vary depending on the implementation. It is further noted that other internal hardware or peripheral devices, such as flash ROM (or equivalent non-volatile memory) or optical disk drives and the like, may be used in addition to or in place of the hardware depicted in FIG. 1.

FIG. 2—Processor

Figure 2:
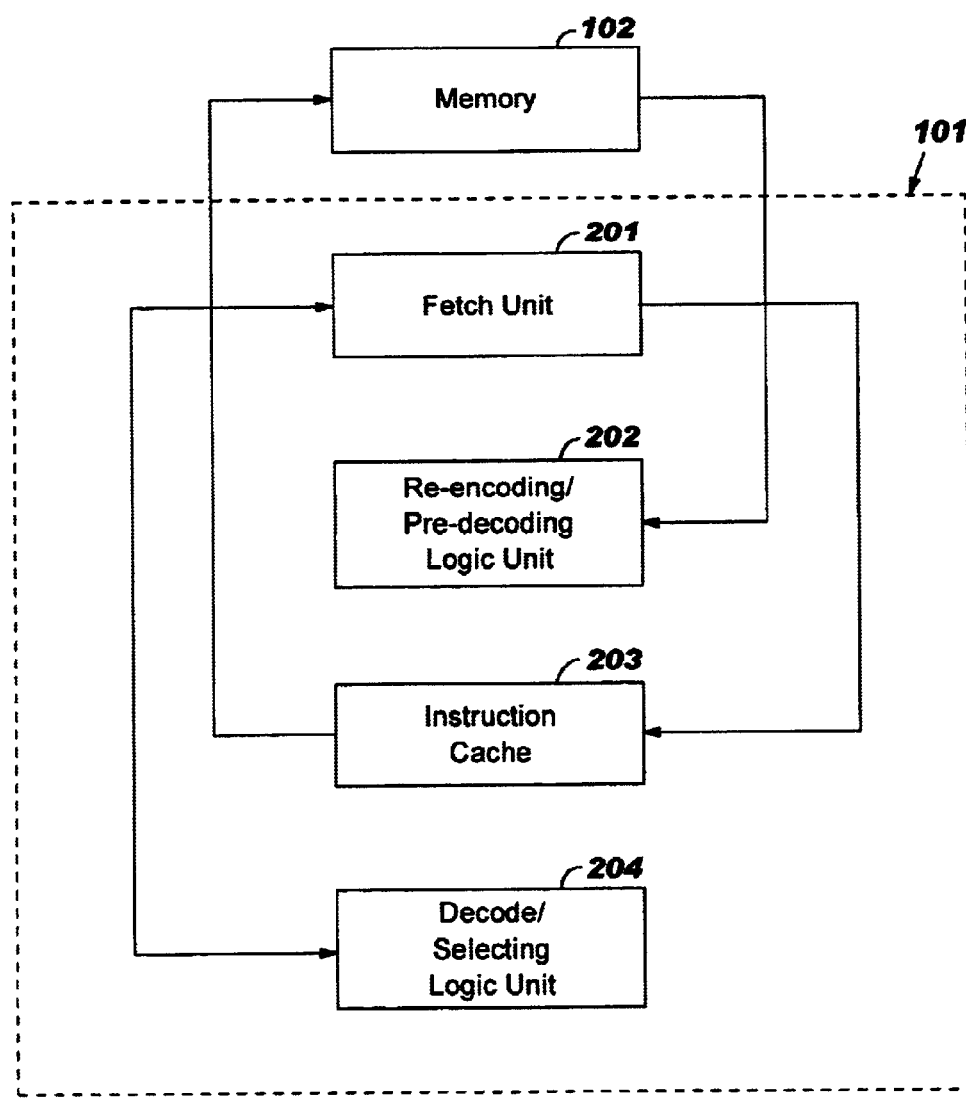
FIG. 2 illustrates a processor in the system configured in accordance with the present invention.

FIG. 2 illustrates an embodiment of processor 101 in accordance with the present invention. Processor 101 may comprise a fetch unit 201 coupled to an instruction cache 203 and to a decode/selecting logic unit 204. Re-encoding/Pre-decoding logic unit 202 may be coupled to memory 102 (FIG. 1) and to instruction cache 203. Instruction cache 203 may be further coupled to memory 102 and to decode/selecting logic unit 204. It is noted that processor 101 may comprise additional units not shown and that FIG. 2 is illustrative.

Referring to FIGS. 1 and 2, fetch unit 201 may be configured to identify the next instruction to be executed by processor 101. Upon identifying the next instruction to be executed, fetch unit 201 may be configured to search instruction cache 203 to determine if a copy of the address of the next instruction to be executed is located within instruction cache 203. If a copy of the address is located within instruction cache 203, a "cache hit" is said to occur. If a copy of the address is not located within instruction cache 203, a "cache miss" is said to occur.

If a cache miss occurs, then instruction cache 203 in conjunction with fetch unit 201 may be configured to fetch the instruction from memory 201. The instruction fetched may then be encoded by re-encoding/pre-decoding logic unit 202. Re-encoding/Pre-decoding logic unit 202 may further be configured to re-encode illegal op codes into a single illegal op code. An op code may refer to an operation code of an instruction that tells a computer what to do, such as input, add or branch. Typically, the op code may be stored in the upper order bits of the instruction. An illegal op code may refer to an undefined op code that may result in an error if the instruction containing the illegal op code is executed.

As stated above, illegal op codes may be re-encoded into a single illegal op code by re-encoding/pre-decoding logic unit 202. The previously illegal op codes which have been re-mapped into a common illegal op code may now be used to store pre-decoded information, e.g., carry-bit, as explained in greater detail in conjunction with FIG. 3.

Re-encoding/Pre-decoding logic unit 202 may further be configured to determine if the fetched instruction is a defined instruction for which pre-decoding is to be performed as described in further detail in conjunction with FIG. 3. If the fetched instruction is a defined instruction for which pre-decoding is to be performed, then re-encoding/pre-decoding logic unit 202 may be configured to pre-decode the instruction producing additional pre-decoding information. Details regarding re-encoding/pre-decoding logic unit 202 pre-decoding the instruction producing additional pre-decoded information are disclosed in U.S. application Ser. No. 10/082,144 filed on Feb. 25, 2002, entitled "Efficiently Calculating a Branch Target Address," which is hereby incorporated herein by reference. The pre-decoded instruction may then be re-encoded, i.e., the op code and other fields of the pre-decoded instruction including fields storing additional pre-decoded information may be re-encoded into a previously illegal op code which has been re-mapped into a common illegal op code. By utilizing the encodings formerly occupied by the illegal op codes to hold the fields associated with additional pre-decoded information, such pre-decoded instructions may be stored in the instruction cache in their pre-decoded form without requiring any additional bits of storage. By not increasing the number of bits required to represent each instruction in the instruction cache, the physical size of the cache required to hold any given number of instructions may not be increased.

Upon re-encoding/pre-decoding logic unit 202 performing the functions as outlined above, re-encoding/pre-decoding logic unit 202 may be configured to store the re-encoded or the re-encoded/pre-decoded instruction in instruction cache 203. Instruction cache 203 may be a high-speed cache memory configured for storing instructions. Instruction cache 203 may be configured to store commonly or recently accessed blocks of data. It is noted that instruction cache 203 may be configured with any associativity, e.g., set associative or direct map configuration. Instructions in instruction cache 203 may be retrieved by decode/selecting logic unit 204. These instructions may be decoded by decode/selecting logic unit 204.

Re-encoding/Pre-decoding logic unit 202 may further be configured to deliver the fetched instruction in an unmodified form to instruction cache 203 if the fetched instruction is not a member of a group of illegal op codes and is not a defined instruction for which pre-decoding is to be performed.

Decode/selecting logic unit 204 may be configured to decode instructions retrieved from instruction cache 203. Details of decode/selecting logic unit 204 decoding instructions received from instruction cache 203 which have been stored in instruction cache 203 in their pre-decoded form are disclosed in U.S. application Ser. No. 10/082,144 filed on Feb. 25, 2002, entitled "Efficiently Calculating a Branch Target Address."

Decode/selecting logic unit 204 may further be configured to deliver the decoded instruction to an instruction processing unit (not shown) configured to process the instruction as would be understood by a person of ordinary skill in the art.

FIG. 3—Method for Utilizing Bits In an Illegal Op Code In Order to Not Increase the Number of Bits Required to Represent Each Instruction in the Instruction Cache FIG. 3 is a flowchart of one embodiment of the present invention of a method 300 for utilizing bits in an illegal op code in order to not increase the number of bits required to represent each instruction in the instruction cache and thus prevent the increase in the physical size of the instruction cache.

Returning now to FIG. 3, in conjunction with FIG. 2, in step 301, an instruction may be fetched from memory 102 by instruction cache 203.

In step 302, a determination may be made by re-encoding/pre-decoding logic unit 202 as to whether the fetched instruction is an instruction with an illegal op code that is a member of a particular group of illegal op codes. If the fetched instruction is an instruction with an illegal op code that is a member of this group of illegal op codes, e.g., binary values of 111000, 111100, then re-encoding/pre-decoding logic unit 202 may re-encode the illegal op code into a single illegal op code, e.g., binary value of 000001, in step 303. As stated above, an op code may refer to an operation code of an instruction that tells a computer what to do, such as input, add or branch. Typically, the op code may be stored in the upper order bits of the instruction. An illegal op code may refer to an undefined op code that may result in an error if the instruction containing the illegal op code is executed.

Upon re-encoding the illegal op code into a single illegal op code, the re-encoded instruction may be stored in instruction cache 203 in step 304. Subsequently, another instruction may be fetched from memory 102 by instruction cache 203 in step 301.

If the fetched instruction is not an instruction with an illegal op code, then re-encoding/pre-decoding logic unit 202 may determine, in step 305, whether the fetched instruction is to have pre-decoding performed. In one embodiment, re-encoding/pre-decoding logic unit 202 may determine whether the fetched instruction is to have pre-decoding performed by reading the op code. If re-encoding/pre-decoding logic unit 202 determines that the fetched instruction is not to have pre-decoding performed, then the unmodified instruction may be stored in instruction cache 203 in step 306. Subsequently, another instruction may be fetched from memory 102 by instruction cache 203 in step 301.

If re-encoding/pre-decoding logic unit 202 determines that the fetched instruction is to have pre-decoding performed, then re-encoding/pre-decoding logic unit 202 may pre-decode the instruction producing additional pre-decoded information in step 307. Details of a particular example regarding encoding/pre-decoding logic unit 202 pre-decoding the instruction producing additional pre-decoded information are disclosed in U.S. application Ser. No. 10,082,144 filed on Feb. 25, 2002, entitled "Efficiently Calculating a Branch Target Address." It is noted that other forms of instruction pre-decoding may be performed resulting in additional pre-decoded information that may be stored in a previously defined illegal op code. In step 308, re-encoding/pre-decoding logic unit 202 may then re-encode the pre-decoded instruction, i.e., re-encoding the op code and other fields including those fields storing the additional pre-decoded information of the pre-decoded instruction into a previously illegal op code which has been re-mapped into a common illegal op code, in order to store the additional pre-decoded information in the previously illegal op code. For example, re-encoding/pre-decoding logic unit 202 may detect a relative branch instruction, which comprises an op code, e.g., binary value of 100000, a sign-bit, and a 25-bit displacement field. Re-encoding/Pre-decoding logic unit 202 may pre-decode this relative branch instruction by replacing the 25-bit displacement field with a 25-bit partial sum field and a 1-bit carry-out field. The 25-bit partial sum field may be formed by adding the 25-bit displacement field to the low-order 25 bits of the address of the branch instruction itself. The 1-bit carry-out field may be the carry-out of this 25-bit addition. In order to avoid the need for an extra storage bit in the instruction cache for this pre-decoded carry-out field, re-encoding/pre-decoding logic unit 202 may re-encode the op code, e.g., binary value of 100000, of the pre-decoded instruction into a previously illegal op code, e.g., binary value of 111C00, which has been re-mapped into a common illegal op code. The "C" may refer to the carry-out field designated to store carry-out bit thereby effectively utilizing the vacated op code space of the former illegal op codes re-mapped into a common illegal op code. Hence, by utilizing bits in an illegal op code which has been re-mapped into a common illegal op code, the number of bits required to represent each instruction in the instruction cache may not be increased. By not increasing the number of bits required to represent each instruction in the instruction cache, the physical size of the cache required to hold any given number of instructions may not be increased.

The re-encoded/pre-decoded instruction may be stored in instruction cache 203 in step 309. Subsequently, another instruction may be fetched from memory 102 by instruction cache 203 in step 301.

It is noted that the above method 300 may be performed in multiple processions thereby allowing instruction cache 203 to fetch a plurality of instructions from memory 102. It is further noted that method 300 may be executed in a different order presented and that the order presented in the discussion of FIG. 3 is illustrative. It is further noted that certain steps in method 300 may be executed almost concurrently.

Although the system and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for utilizing bits in an illegal op code in order to not increase the number of bits required to represent each instruction comprising the steps of:
    fetching a plurality of instructions from a memory;
    re-encoding one or more illegal op codes of one or more instructions into a single illegal op code if said one or more instructions comprise illegal op codes that are a member of a group of illegal op codes;
    pre-decoding a fetched instruction that has a legal op code; and
    re-encoding the legal op code and one or more fields of said pre-decoded instruction into a previously illegal op code which was re-mapped into said single illegal op code.

2. The method as recited in claim 1, wherein said pre-decoding produces additional pre-decoded information, wherein said re-encoded pre-decoded instruction is configured to store said additional pre-decoded information in said previously illegal op code.

3. The method as recited in claim 2, wherein said additional pre-decoded information comprises a carry-out field.

4. The method as recited in claim 3, wherein said carry-out field is associated with a fetched branch instruction.

5. A processor, comprising:
    an instruction cache configured to fetch a plurality of instructions; and
    a logic unit coupled to said instruction cache configured to re-encode one or more illegal op codes of one or more instructions into a single illegal op code if said one or more instructions comprise illegal op codes that are a member of a group of illegal op codes, wherein said logic unit is further configured to pre-decode a fetched instruction that has a legal op code, wherein said logic unit is further configured to re-encode the legal op code and one or more fields of said pre-decoded instruction into a previously illegal op code which was re-mapped into said single illegal op code.

6. The processor as recited in claim 5, wherein said pre-decoding produces additional pre-decoded information, wherein said re-encoded pre-decoded instruction is configured to store said additional pre-decoded information in said previously illegal op code.

7. The processor as recited in claim 6, wherein said additional pre-decoded information comprises a carry-out field.

8. The processor as recited in claim 7, wherein said carry-out field is associated with a fetched branch instruction.

9. A processor, comprising:
    means for fetching a plurality of instructions from a memory;
    means for re-encoding one or more illegal op codes of one or more instructions into a single illegal op code if said one or more instructions comprise illegal op codes that are a member of a group of illegal op codes;
    means for pre-decoding a fetched instruction that has a legal op code; and
    means for re-encoding the legal op code and one or more fields of said pre-decoded instruction into a previously illegal op code which was re-mapped into said single illegal op code.

10. The processor as recited in claim 9, wherein said pre-decoding produces additional pre-decoded information, wherein said re-encoded pre-decoded instruction is configured to store said additional pre-decoded information in said previously illegal op code.

11. The processor as recited in claim 10, wherein said additional pre-decoded information comprises a carry-out field.

12. The processor as recited in claim 11, wherein said carry-out field is associated with a fetched branch instruction.

13. A system, comprising:
    A memory configured to store instructions,
    An instruction cache coupled to said memory, wherein said instruction cache is configured to fetch a plurality of instructions from said memory,
    A logic unit coupled to said instruction cache configured to re-encode one or more illegal op codes of one or more instructions into a single illegal opcode if said one or more instructions comprise illegal op codes that are a member of a group of illegal op codes, wherein said logic unit is further configured to pre-decode a fetched instruction that has a legal op code, wherein said logic unit is further configured to re-encode the legal op code and one or more fields of said pre-decoded instruction into a previously illegal op code which was re-mapped into said single illegal opcode.

14. The system as recited in claim 13, wherein said pre-decoding produces additional pre-decoded information, wherein said re-encoded pre-decoded instruction is configured to store said additional pre-decoded information in said previously illegal op code.

15. The system as recited in claim 14, wherein said additional pre-decoded information comprises a carry-out field.

16. The system as recited in claim 15, wherein said carry-out field is associated with a fetched branch instruction.

* * * * *